United States Patent [19]
Dwenger et al.

[11] Patent Number: 5,538,063
[45] Date of Patent: Jul. 23, 1996

[54] AIRCRAFT TIRE WITH REINFORCEMENT INSERT

[75] Inventors: Thomas A. Dwenger, Uniontown; Robert J. Lucht, Medina; David C. Wagner, Akron, all of Ohio

[73] Assignee: The Goodyear Tire & Rubber Company, Akron, Ohio

[21] Appl. No.: 363,086

[22] Filed: Dec. 23, 1994

[51] Int. Cl.⁶ .............................. B60C 9/00; B60C 9/06; B60C 9/08; B60C 15/05
[52] U.S. Cl. ................... 152/455; 152/458; 152/545; 152/555; 152/559; 152/560
[58] Field of Search ..................................... 152/192, 196, 152/197, 458, 455–456, 545, 555, 559–560

[56] References Cited

U.S. PATENT DOCUMENTS

| | | |
|---|---|---|
| 3,077,915 | 2/1963 | Weber .................................. 152/555 X |
| 3,339,610 | 9/1967 | Fausti et al. . |
| 3,435,875 | 4/1969 | Devienne ................................ 152/455 |
| 3,613,762 | 10/1971 | Rienhart, Jr. . |
| 3,693,690 | 9/1972 | Mills et al. . |
| 3,703,203 | 11/1972 | Simpson . |
| 3,982,578 | 9/1976 | Wild .................................... 152/555 X |
| 4,029,137 | 6/1977 | Suydam . |
| 4,295,511 | 10/1981 | Mezzanotte et al. .................... 152/555 |
| 4,377,193 | 3/1983 | Smith . |
| 4,442,880 | 4/1984 | Takahashi . |
| 4,609,023 | 9/1986 | Loser . |
| 4,790,364 | 12/1988 | Lobb et al. . |
| 4,890,660 | 1/1990 | Lamock . |
| 4,934,428 | 6/1990 | Aoki et al. . |
| 5,007,472 | 4/1991 | Kuze et al. . |
| 5,088,537 | 2/1992 | Kan et al. . |
| 5,105,865 | 4/1992 | Togashi et al. . |
| 5,117,886 | 6/1992 | Tokutake . |

FOREIGN PATENT DOCUMENTS

| | | |
|---|---|---|
| 1115834 | 5/1968 | United Kingdom .................... 152/455 |
| 2087806 | 6/1982 | United Kingdom . |

Primary Examiner—Adrienne C. Johnstone
Attorney, Agent, or Firm—David L. King

[57] ABSTRACT

An aircraft tire 10 has at least one circumferentially extending reinforcement insert. At least one reinforcement insert 90 is located on one side of the tire. Each insert 90 preferably has two cord reinforced members 91,92 having bias angled cords. The cords are equal but opposite in orientation relative to the cords of the adjacent member. The pairs of reinforced members 91,92 extend from the bead portion 18,20 and terminate in a radially upper portion of the sidewall 14A,16A. Bach pair of reinforced members 91,92 is interposed between the carcass plies 36,37,38,39,40,41, and the sidewall of the tire 10. In a preferred embodiment of the invention the inserts 90 are located on only one side of the tire. Alternatively, the inserts can be symmetrically added to each side of the tire.

9 Claims, 4 Drawing Sheets

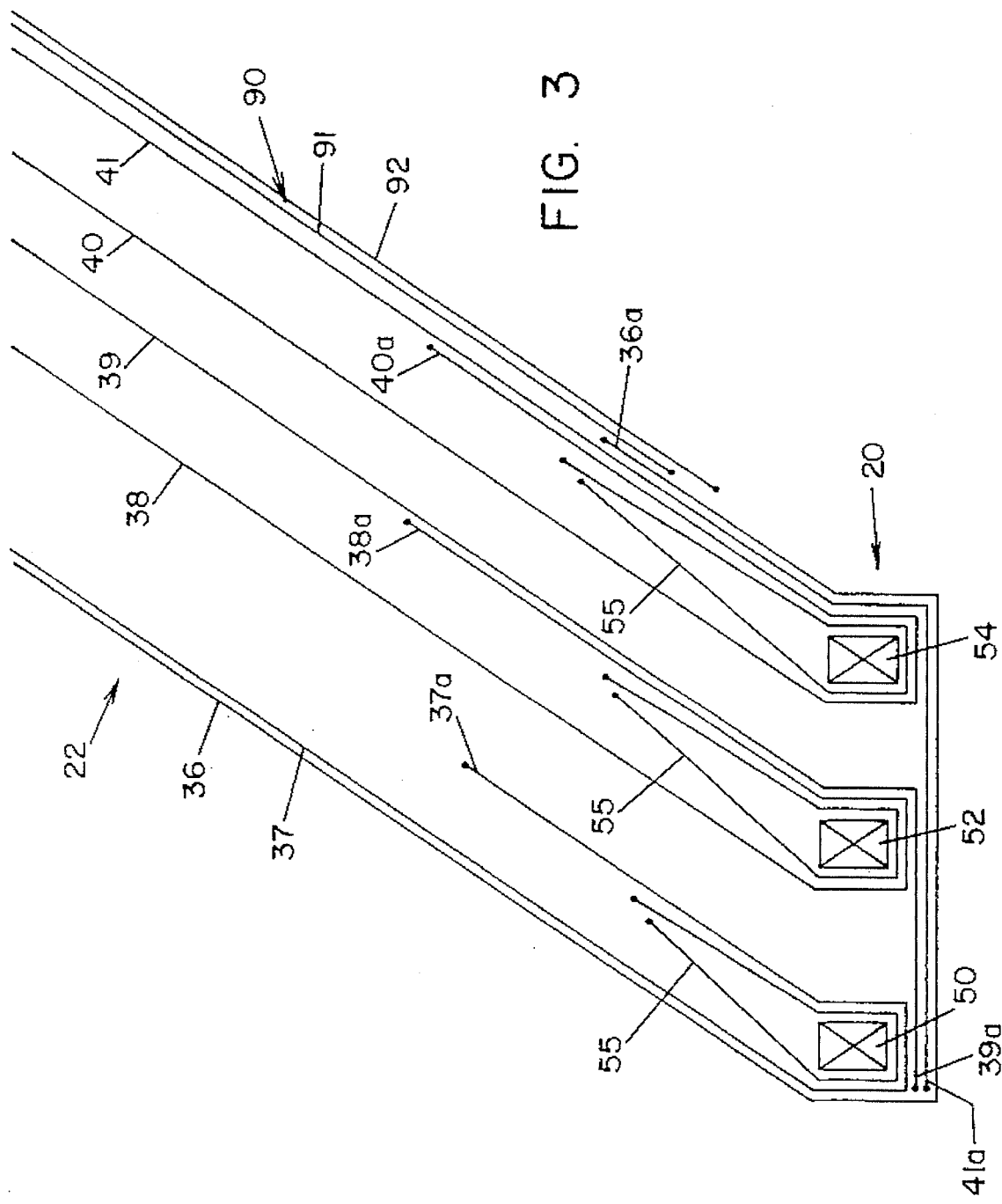

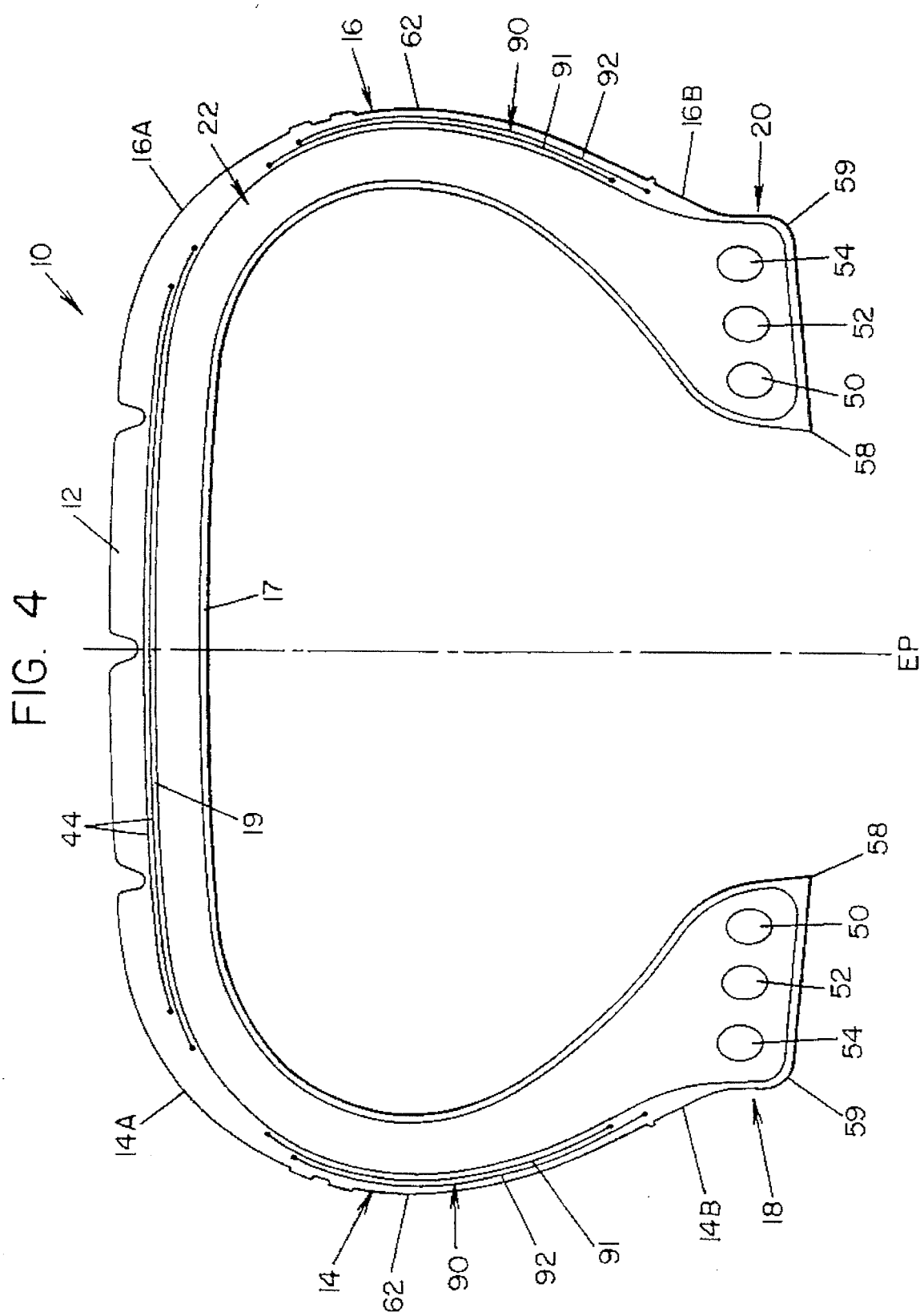

AIRCRAFT TIRE WITH REINFORCEMENT INSERT

BACKGROUND OF THE INVENTION

This invention relates to pneumatic tires and more particularly to a novel carcass structure specifically for use in aircraft tires.

An aircraft tire is subjected to extreme operating conditions which include very high internal pressure, high speeds in excess of 300 kilometers per hour, and very high deflections. During taxiing and takeoff, the deflection may be more than 30%, and on landing 45% deflection or more under impact conditions. These extreme pressures, loads and deflections put the sidewall between the shoulder of the tire and the bead to severe tests. The high pressure and loads place the ply cords under severe tensile loads. The cords in the plies, particularly in the lower sidewall area, are frequently mechanically fatigued due to high heat buildup near the beads while the aircraft is taxiing or during takeoff.

In the prior art, it has been conventional to increase the number of plies of the tire to increase rigidity and to decrease deformation under load. Also much work has been directed to reinforcing the ply turnup portion of tires to improve durability.

U.S. Pat. No. 5,105,865 by Togashi et al. describes these conventional solutions and proposes that the durability of the tire can be improved by avoiding bending deformations of the ply surfaces. The patent describes a tire curvature that permits an increase in durability to be achieved with no increase in weight.

U.S. Pat. No. 4,029,137 by Robert Suydam teaches that an improvement in durability can be achieved by a novel wrapping of the ply structure about the beads. This invention also improves durability without increasing weight.

In British Patent GB 2 087 806 to Kaisha, a bias aircraft tire is disclosed wherein cords of the carcass plies are spaced further apart to achieve improved durability.

In addition to the normal loading conditions of aircraft tires military aircraft, in particular naval airships often are required to land on the decks of aircraft carriers. The landings are routinely harsh and rapid due to the shortened landing area. To stop the aircraft, an arrestor cable is employed. The nose wheel or main landing gear wheel of the aircraft impacts this 1⅝ inch diameter arrestor cable on landings and can severely damage the tire. On the F/A-18E/F naval aircraft the main tire can see a camber angle of 10.2°. This means that one sidewall will take the initial impact at about five times the normal rated load. This pinches the impacted sidewall severely which can result in cut or damaged carcass plies. Repeated landings result in cumulative damage. To extend the life of the main tire additional full width carcass plies have been used; however, this imposes a weight penalty.

The present invention discloses a novel approach to improve sidewall durability while enabling a reduction in overall tire weight.

SUMMARY OF THE INVENTION

An improved aircraft tire having a tread portion 12, a pair of sidewall portions 14,16, a pair of spaced apart bead portions 18,20 having at least one, preferably two or three inextensible bead cores 50,52,54 disposed side-by-side and spaced apart axially, and a plurality of carcass plies 36,37, 38,39,40,41 extending circumferentially about the tire 10 from bead portion 18 to bead portion 20 is described. Each ply has a ply side extending between the bead cores 50,52,54 of opposite bead portions.

The improved tire 10 has at least one circumferentially extending reinforcement insert 90. At least one reinforcement insert 90 is located on one or on both sides of the tire 10. The reinforcement inserts 90 extend from the bead portion 18,20 and terminate in a radially upper portion of the sidewall 14A, 16A. Each insert 90 is interposed between the carcass plies and the sidewall.

Preferably, the reinforcement insert 90 consists of a pair of axially adjacent cord reinforced members 91,92, each cord reinforced member 91,92 having bias angled cords, the cords being equal but opposite in orientation relative to the cords of the adjacent member. The pair of cord reinforced members 91,92 preferably have an elongation at break under load similar to the adjacent carcass plies 36,37,38,39,40,41. Preferably, the cords of the ply and the reinforced member 91,92 are the same; and more preferably, the cords are textile cords such as nylon or aramid cords. Alternatively, the reinforcement insert 90 can be an elastomeric material containing fiber reinforcement.

DESCRIPTION OF THE DRAWINGS

FIG. 3 is a schematic view of one half of the tire showing the ply, insert, and bead core orientation;

FIG. 4 is a cross-sectional view illustrating a second embodiment tire made in accordance with the present invention.

DEFINITIONS

Figure 1:
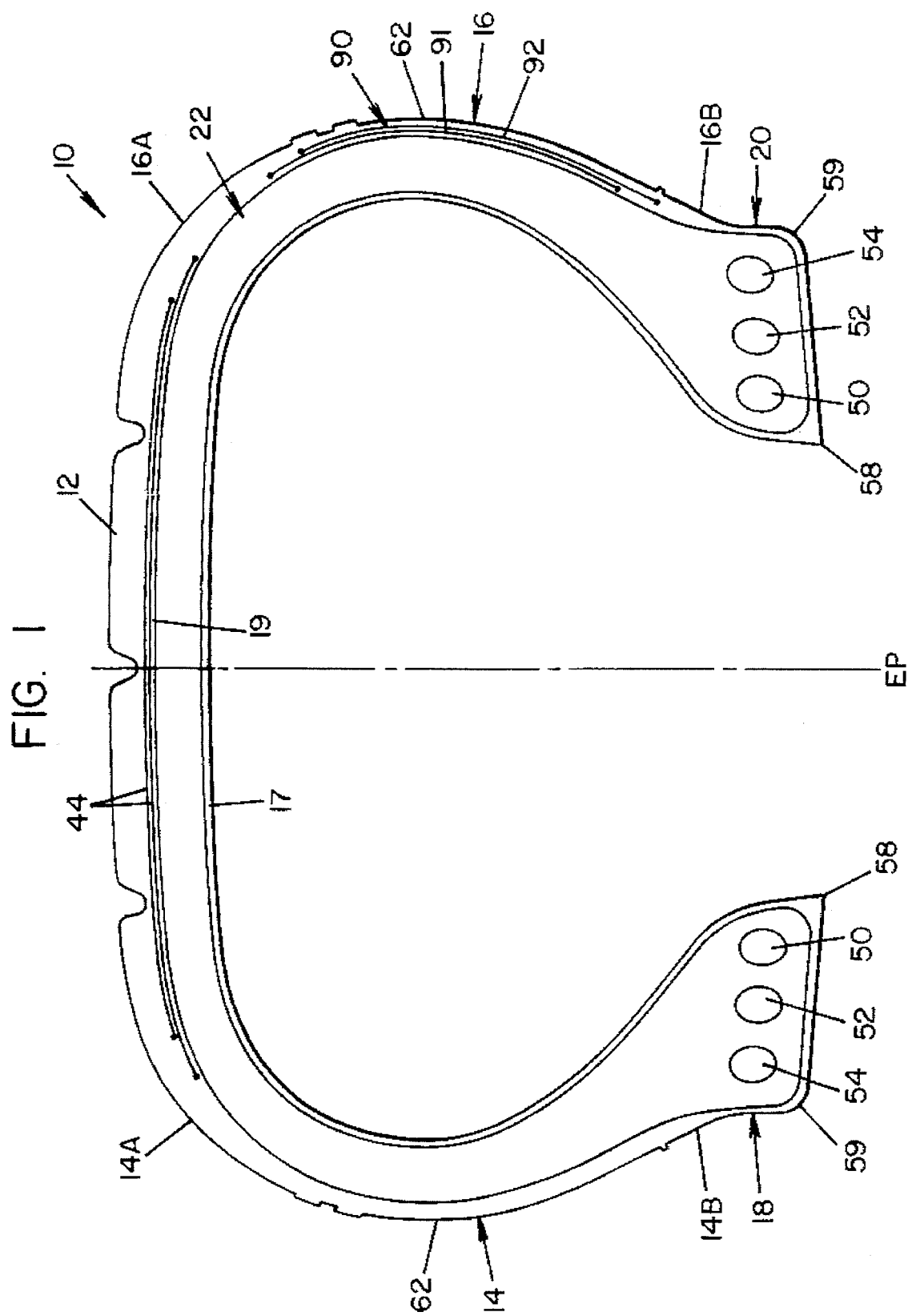
FIG. 1 is a cross-sectional view illustrating the improved aircraft tire made in accordance with the present invention.

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about a 25°–50° angle with respect to the equatorial plane of the tire. Cords run at opposite angles in alternate layers.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

DETAILED DESCRIPTION OF THE INVENTION

With reference to FIG. 1, there is illustrated a tire 10 which in the specific embodiment illustrated is a size 32x11.5-15 tire. The tire has a 81.3 cm (32 inch) maximum inflated outside diameter and the maximum width of the inflated tire in the axial direction is 29.2 cm (11.5 inches) and the tire has a nominal bead diameter of 38.1 cm (15 inches).

The tire 10 includes a ground engaging circumferentially extending tread portion 12, a pair of sidewalls 14,16 extending radially inwardly from the axially outer edges of the tread portion and terminating at their radial extremities in a pair of bead portions 18,20. The sidewalls 14,16 each have an upper portion 14A,16A in the shoulder region of the tire radially inward of the tread and radially outward of the maximum section width of the tire, and a lower portion 14B,16B radially inward of the maximum section width of the tire. A cord reinforced carcass structure 22 extends circumferentially about the tire from bead portion 18 to bead portion 20.

The particular embodiment of the cord reinforced carcass structure 22 includes six pairs of plies of tire cord fabric 36,37,38,39,40, and 41. Each pair of plies has one of its plies extending at one bias angle with respect to the equatorial plane or circumferential center line of the tire, and the other ply at the same angle but extending in the opposite direction with respect to the equatorial plane. The angle that the cords in the individual carcass plies make with respect to the equatorial plane decreases progressively from an angle of about 34° in the radially inner pair of plies 36 to 30° in the radially outer pair of plies 41.

Also included in the carcass structure is a pair of tread breaker plies 44 extending circumferentially about the carcass and generally from one edge of the tread portion 12 to the axially opposite edge of the tread portion 12. The angle of the cords in the tread breaker plies with respect to the equatorial plane is approximately 26°. The material of the cords in all of the plies in the carcass structure 22 is nylon although any suitable material or combination of materials can be utilized. It is believed preferable that the cords be a textile material. Further, while specific angles have been specified for the carcass and tread breaker plies, these angles can be varied within the normal range of bias ply aircraft tires. For example, the angles of the carcass plies could be from 25° to 45° while the angle of the tread breaker plies can be from about 20° to 45° for a bias ply aircraft tire.

Interposed between the tread breaker plies 44 and the carcass plies is a cushion gum layer 19.

The bead portions 18,20 each include three annular inextensible bead cores 50,52 and 54.

Two pairs of carcass plies 36 and 37 extend radially inwardly of the tire adjacent to the axially inner side of the axially inner bead core 50. The respective ends 36a and 37a are turned axially outwardly about bead core 50 and ply ends 37a are turned radially outwardly about bead core 50 while ply ends 36a turn radially outwardly about bead core 54.

Carcass plies 38 similarly extend radially inwardly adjacent to the axially inner side of the central or middle bead core 52 and have their ends 38a turned radially outwardly of the bead core 52.

Carcass plies 39 extend radially inwardly about the axially outer side of the middle bead core 52 and the ply ends 39a are turned axially inwardly adjacent the radially inner sides of the inextensible bead cores 50 and 52. Since the pairs of carcass plies 39 are wrapped about two sides of the bead core 52 as they progress radially inwardly from the tread 12, the tensile loading of these plies caused by inflation pressure and loading on the tire are supported by bead core 52.

The axially outer bead core 54 has a pair of carcass plies 40 extending radially inwardly adjacent the axially inner side of the bead core and has its ends 40a turned axially outwardly adjacent the radially inner side of the bead core. The turnup ends 40a turn radially outwardly adjacent the axially outer side of the bead core 54.

Carcass plies 41 extend radially inwardly interposed between the turnup ends 36a and the axially outer side of the bead core 54. The carcass ply ends 41a each turn axially inwardly adjacent the radially inner side of bead core 54 extending inwardly to the radially inner side of bead core 50. The ends 41a is interposed between the bead cores 50,52 and 54's radially inner sides and the ends portions 36a. The ends 36a terminate in the lower sidewall area at a point radially inwardly of the point 62 of maximum section width of the inflated tire.

For the purposes of this invention, end portions shall be those portions of a carcass ply pairs that wraps about or extends radially outwardly from a bead core. If the end portions terminate short of the point 62 of maximum axial width of the tire, it is not considered working portions of the plies since it does not exert a significant radially outwardly directed pull on the bead core. A bead core that absorbs a major radially outwardly directed pull of the carcass plies is an active or working bead core, and for purposes of this invention is a bead core bounded on any axial side and a radially inner side by the working portions of the carcass plies. The working portions of the carcass plies is that portion of the plies extending from a bead on one side of the tire to the opposite side's bead, and for purposes of this invention the working portion of the carcass plies is called the ply side; the non-working portion is the turn-up or end portions of the plies.

Figure 2:
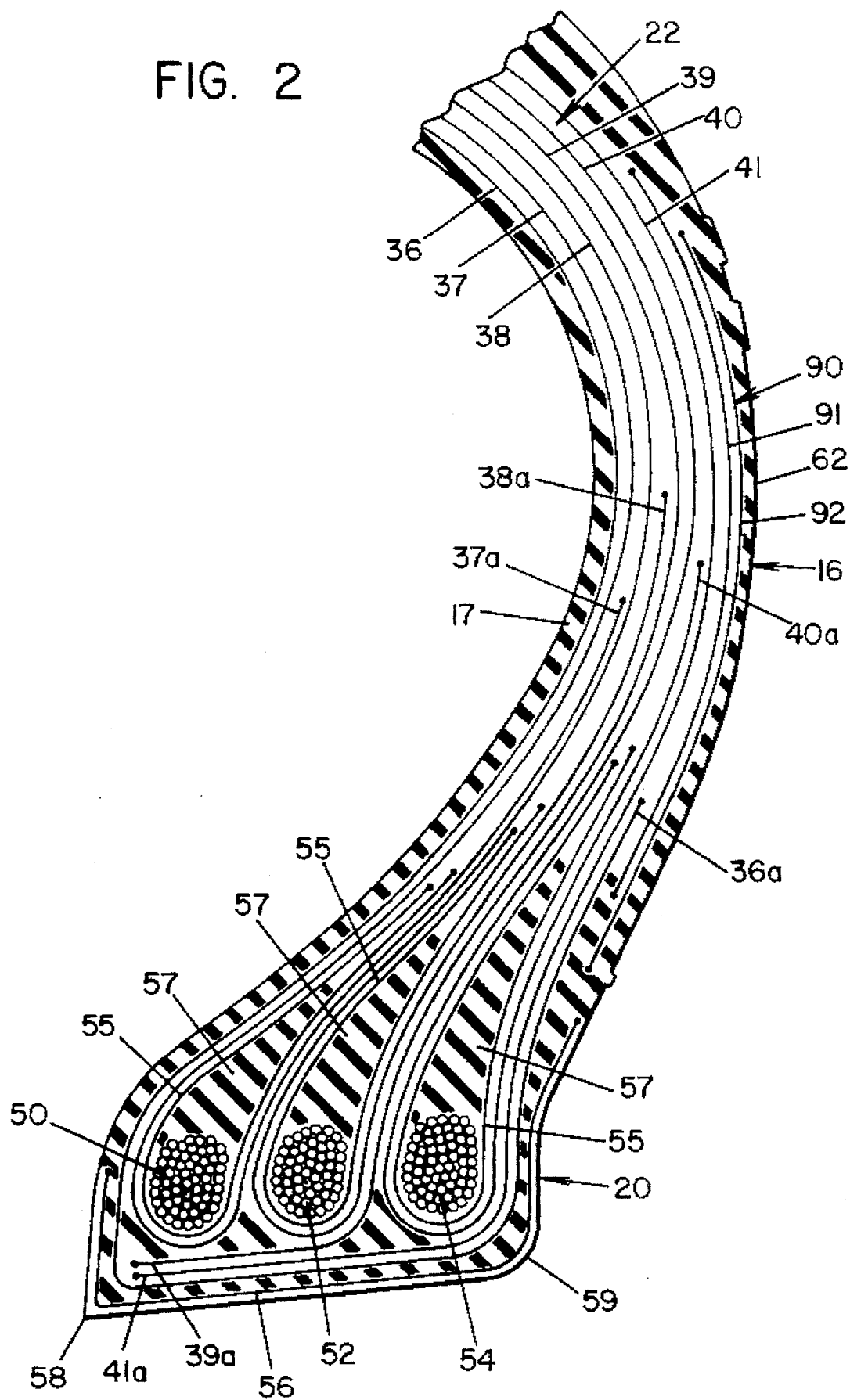
FIG. 2 is a further enlarged cross-sectional view illustrating one side or half of a tire made in accordance with the present invention.

Referring to FIG. 2 of the embodiment illustrated, a group of structural components employed in the tires is shown.

Radially above each bead core 50,52,54 is an elastomeric apex 57. Wrapped about each bead core and axially adjacent each apex is a flipper 55. Wrapped about the entire bead structure is a chafer 56. The chafer 56 extends radially inwardly from an axially outer end toward the bead heel 59, turns axially inwardly extending to the bead toe 58 where the chafer 56 turns radially outwardly to an axially inner end. In the embodiment as illustrated, the air chamber formed by the tire is surrounded by a generally air impervious innerliner 17 extending from bead to bead.

As illustrated in FIGS. 1 and 2, and shown in schematic FIG. 3, a reinforcement insert 90 is radially outward of the pair of plies 40,41. As shown, the inserts 90 are positioned on the radially outer side of the plies and extend from adjacent or slightly above the bead cores radially and axially outwardly to a radially outer end below the tread 12 in the upper sidewall 14A,16A region between the carcass 22 and the sidewall.

In the best mode of practicing the invention, the reinforcement inserts 90 consist of a pair of cord reinforced members 91,92. The cords in the reinforced members 91,92 are at bias angles relative to the circumferential center line, the cord angle of one member of a pair being equal to but opposite in orientation relative to the cords of the adjacent member of the same pair.

It is believed preferable that the insert cords have a tensile elongation at break substantially similar to the nylon cord of the plies. For that reason, the cords in the preferred embodiment were made of nylon. Alternatively, the cords could be any other suitable textile type materials.

It is believed that the reinforcement insert 90 could be fabricated from an elastomeric material having fiber reinforced materials.

In the preferred embodiment the reinforcement insert 90 extends circumferentially around the tire 10 on only one side. The purpose of the reinforcement insert 90 is to increase the carcass 22 lower to upper sidewall impact durability with a corresponding decrease in weight when compared to conventional bias ply aircraft tires. The carcass impact strength is increased by locating impact absorbing reinforcement inserts 90 in the sidewall 14,16.

In a first use of the invention as illustrated in FIG. 1, the inserts 90 were fabric plies 91,92 having the same green angle as the adjacent full casing plies. The insert fabric plies 91,92 were located in the tire 10 in pairs, one fabric member 91 oriented at an angle left and one fabric member 92 at an equal angle right. One such two-ply fabric insert 90 was located adjacent the axially outer side of the bead core 54 and extended radially outwardly to the upper sidewall portion 16A. The inserts 90 were located radially outward of the full band plies and had the radially inner ends purposely terminated such that the insert ends did not extend around the bottom of the bead 54.

Although one set of inserts 90 per tire side was contemplated in the early evaluation of this invention, it was determined that one set on one side was sufficient in the application being evaluated. One, two, three or four sets of inserts 90 per tire side can be used, depending on how much additional carcass impact strength is required.

Although the inserts 90 were used having pairs of bias angled cord reinforced members 91,92, it is believed that the cord reinforced members 91,92 can be individually used. Also in the above description, the cord reinforced members had bias angles in the same range as the carcass plies. Alternatively, higher angles up to 90° could be used.

Historically, bias ply aircraft tires have been designed with full width carcass plies, which extend from a bead bundle on one side of the tire to the bead bundle on the other side of the tire. In order to increase carcass strength in any one area of the tire, it was common practice to add full width plies to the carcass. The present invention, by adding fabric or fiber inserts between the plies and the sidewall of the tire, strengthens only the area requiring the impact strength increase. Since full plies are not used, there is a substantial tire weight savings.

An aircraft tire 10 built in accordance with the present invention as shown in FIGS. 1, 2, and 3 was tested against standard production aircraft tires for impact durability. The standard or control tire was size 32x11.5-15 and the test tire 10 was made of the same materials and of similar construction as the standard tire, except for the addition of the fabric reinforced insert plies 91,92 on the non-serial numbered side. The test tire 10, according to the present invention, exhibited a marked improvement over the impact durability of the standard tire without inserts.

In a tire 10 built according to the present invention and for use in an aircraft currently in development as illustrated in FIGS. 1–3, an increase in durability was achieved using only one insert 90 on one side of the tire. A standard tire with the same number of full plies as the test tire but without inserts was evaluated. It failed the impact durability test. This standard tire had a weight of 67 pounds. The tire according to the invention passed the test and had weight of 68.1 pounds. To achieve the same level of sidewall impact durability using two additional conventional full ply pairs a tire weight of 73.4 pounds would result. As can be seen above, significant impact durability improvements can be achieved without the normal weight penalty associated with the use of additional full width plies.

One of the most rigorous requirements of the MacDonald Douglas F/A-18E/F bias main aircraft tire is for the tire 10 to survive the 1⅝" diameter cable load test being more than 5 times rated tire load applied at a camber angle of 10.2 degrees. This severe test pinches the tire sidewall between the wheel and the cable on one side of the tire which can result in the cutting of the carcass plies and if excessive, can cause a failure of the tire structure.

To protect the tire carcass 22 in the sidewall area from such an operation, two layers of fabric 91,92 starting from the tire shoulder area 16A to just above the bead area 20 were inserted between the tire carcass 22 and sidewall 16. The two layers 91,92 are of the same material and ply angle as the carcass plies and are offset 0.5" to avoid high stress concentration at the layer edges. The carcass material is 1260/2 nylon.

For the F/A-18E/F aircraft, the worst case landing (combination of landing gear geometry and aircraft position) would be (non-serial side of tire facing towards the center of the aircraft). Because of this, there is no need to have the two layers of fabric on the serial of the tire 10. This results in an asymmetric tire carcass design.

If tire weight was not an issue, adding full width carcass plies to the tire would be sufficient to protect the tire carcass from the severe cambered cable bruise test.

The tire 10 described in this invention allows the tire to be optimized by adding layers of inserts only where it is needed, that is, two layers 91,92 of fabric starting from the tire shoulder area to just above the bead area.

The radially outer ends of the insert 90 terminates radially below the tread portion 12 in the upper shoulder region of the tread. Preferably, the radially outer ends of the insert 90 are at least about halfway between the point 62 of maximum section width and the axial end of the tread portion 12. When the insert 90 is composed of two fabric plies 91,92, it is preferred that the end of each ply is slightly staggered as illustrated in FIGS. 1, 2 or 3.

In application where the impact can strike either sidewall or both. It is believed that an insert 90 should be employed on both sides of the tire 10 thus forming a symmetrical carcass configuration as shown in FIG. 4.

Although the invention illustrates and describes the use of inserts on bias aircraft tires having at least two bead cores on each side of the tire, it is believed feasible to employ the inserts as described above on radial ply aircraft tires having only one bead per tire side.

What is claimed:

1. An aircraft tire having a tread pattern, a pair of sidewall portions, a pair of spaced apart bead portions having at least one extensible bead core disposed side by side and spaced apart axially, and a plurality of carcass plies extending circumferentially about the tire from bead portion to bead portion, each ply being cord reinforced and having a ply side extending between the bead cores of opposite bead portions, the improvement comprising:

at least one circumferentially extending reinforcement insert on one side of the tire, the reinforcement insert or inserts extending from the bead portion and terminating in a radially upper portion of the sidewall portion, each reinforcement insert or inserts being radially outward of the carcass plies and interposed between the sidewall portion and the carcass plies, the reinforcement insert or inserts having a pair of axially adjacent cold reinforced members, and wherein the cords of the carcass plies and the cords of the reinforced members are the same.

2. The aircraft tire of claim 1, wherein the cord reinforced members have bias angled cords, the cords being equal but opposite in orientation relative to the cords of the adjacent cord reinforced member.

3. The aircraft tire of claim 1 wherein the pair of axially adjacent cord reinforced members of the reinforcement insert or inserts have radially extending cords.

4. The aircraft tire of claim 3 wherein the cords of the plies and the cords of the reinforced members are nylon.

5. The aircraft tire of claim 1 wherein the carcass plies have radially extending cords.

6. The aircraft tire of claim 1 wherein the carcass plies have bias angled cords and are wrapped about at least two inextensible bead cores in each bead portion.

7. The aircraft tire of claim 1 wherein the tire has two reinforcement inserts on one side of the tire.

8. The aircraft tire of claim 1 wherein the tire has three reinforcement inserts on one side of the tire.

9. The aircraft tire of claim 1 wherein the cords of the carcass plies and the cords of the reinforced members are nylon.

* * * * *

UNITED STATES PATENT AND TRADEMARK OFFICE
CERTIFICATE OF CORRECTION

PATENT NO. : 5,538,063
DATED : July 23, 1996
INVENTOR(S) : Thomas Andrew Dwenger, Robert John Lucht, & David Charles Wagner It is certified that error appears in the above-indentified patent and that said Letters Patent is hereby corrected as shown below:

column 8 In claim 1, line 11, of the claim change "cold"

to -- cord --.

Signed and Sealed this

Eleventh Day of February, 1997

*Attest:*

BRUCE LEHMAN

*Attesting Officer*   *Commissioner of Patents and Trademarks*